United States Patent [19]

Scheraga

[11] Patent Number: 4,779,062
[45] Date of Patent: Oct. 18, 1988

[54] SHORT CIRCUIT CURRENT LIMITER

[75] Inventor: William J. Scheraga, Warwick, R.I.

[73] Assignee: Cherry Semiconductor Corporation, East Greenwich, R.I.

[21] Appl. No.: 30,691

[22] Filed: Mar. 24, 1987

[51] Int. Cl.$^4$ ............................................... H02H 7/20
[52] U.S. Cl. ................................ 330/298; 330/207 P; 361/101
[58] Field of Search .............. 330/207 P, 298; 361/98, 361/101

[56] References Cited

U.S. PATENT DOCUMENTS 4,358,812 11/1982 LoCascio et al. .................... 361/152
4,413,300 11/1983 Sumi et al. ........................... 330/298

*Primary Examiner*—Gene Wan
*Attorney, Agent, or Firm*—Robert M. Asher

[57] ABSTRACT

A short circuit limiter having at least one current sink transistor connected to a trip point voltage setting resistor. The trip point voltage setting resistor receives a current which is a function of a reference current. One of the current sink transistors has a base connected above the tip point voltage setting resistor. The emitter of one of the current sink transistors sets the trip point voltage and is connected to the output transistors. If there is a short circuit in a load, the increased current will cause the voltage connection between the output transistors and the current sink transistors to rise up to the trip point voltage at which point, base drive current will be diverted away from the output transistors and through the current sink transistors.

10 Claims, 1 Drawing Sheet

SHORT CIRCUIT CURRENT LIMITER

BACKGROUND OF THE INVENTION

The present invention is directed to a short circuit current limiter, in particular, this invention provides short circuit protection for a circuit that provides current to a load.

Circuits designed for providing current to a load may be subject to catastrophic failure if they are not equipped with circuitry for protecting against a short circuit of the load. An unexpected short could quickly raise the output current so as to burnup components in the circuit. It is an object of the present invention to monitor the current in the output driver and to sink base drive current that exceeds a predetermined limit.

SUMMARY OF THE INVENTION

The short circuit limiter includes a circuit for providing current to a resistor. The resistor is connected to the base of a transistor. One or more transistors may be connected to this first transistor. The voltage set at the base of the first transistor by the resistor is added to the base-emitter voltages of the other transistors to set a trip point voltage. The emitter of the last transistor is set to that trip point voltage. This emitter is connected to the output transistors so that when a large current such as that caused by a short circuited load appears at the output transistors, base drive current to the output transistors exceeding a limit as set by the trip point voltage is diverted through the transistors of the short circuit limiter.

It is especially advantageous to use the present invention when there is a reference current which is used to control the output transistors. The current supplied to the resistor of the short circuit limiter can be made proportional to the reference current so that changes in the desired output current as reflected in the reference current will also be reflected in the voltage trip point. In this manner, the short circuit limiter can be made relatively insensitive to changes such as those caused by temperature.

Other objects and advantages of the invention will become apparent during the following description of the presently preferred embodiment of the invention taken in conjunction with the drawing.

DETAILED DESCRIPTION OF THE PREFERRED EMBODIMENT

Figure 1:
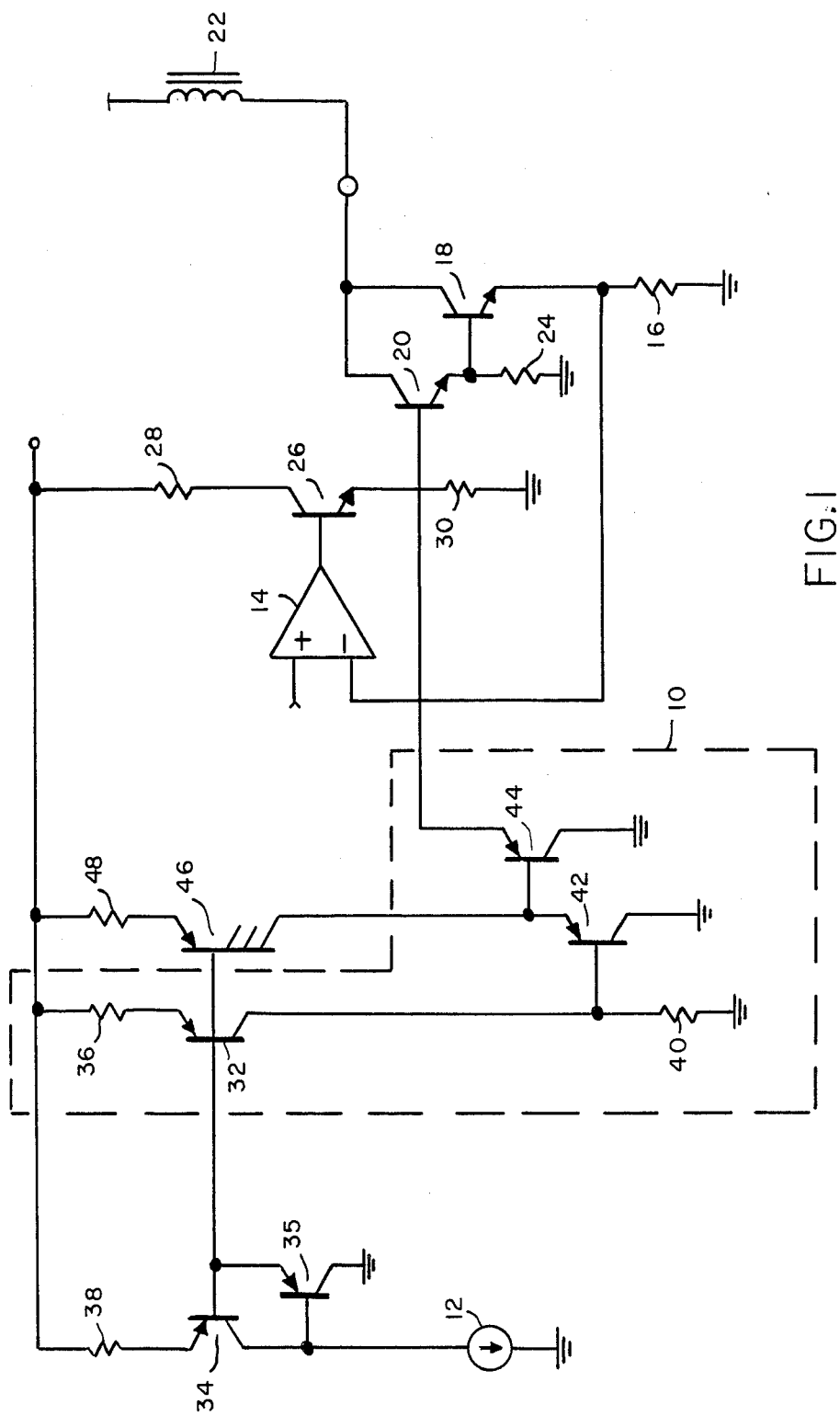
FIG. 1 is a schematic diagram of the short circuit limiter of the present invention attached to a circuit for providing current to a load.

Referring now to the FIG. 1, a short circuit limiter 10 of the present invention is shown in use with a circuit for delivering current to a load. The circuit for providing current to a load includes a reference current source 12 and an amplifier 14 for controlling the output current. It is possible in many applications that the reference current provided by the current source 12 varies with temperature.

In the embodiment shown, the non-inverting input of the amplifier 14 is a reference voltage which is a function of the reference current. The inverting input of the amplifier 14 is a voltage proportional to the output current, as measured at the sensing resistor 16. A pair of output transistors consisting of transistor 18 and transistor 20 provide current to a load 22. The output transistors are connected collector-to-collector to each other. The base of transistor 18 is connected to the emitter of transistor 20. The output current flows through transistor 18 to the sensing resistor 16. Current through transistor 20 flows into the base of transistor 18 or through resistor 24 to ground. Resistor 24 has a relatively high resistance so that the current through resistor 24 is insignificant compared to the current in resistor 16. Control of the output current is provided by the amplifier 14 through a transistor 26. The transistor 26 has a base which is connected to the output of the amplifier 14. The collector of transistor 26 is coupled through a resistor 28 to the source voltage. The emitter of transistor 26 is connected to the base of output transistor 20. Current from transistor 26 is used to provide base drive current to output transistor 20 and thus to control the output current. A resistor 30 is connected between the base of output transistor 20 and ground.

The short circuit limiter includes a transistor 32 and resistor 36 arranged as a current mirror with a transistor 34 and resistor 38 so as to provide a current which is a function of the reference current. The multiplication factor between the reference current and the current provided to the short-circuit limiter can be adjusted by the values of resistors 36 and 38. A transistor 35 is provided on the input branch of the current mirror as a buffer to help preserve the accuracy of the reference current.

The mirrored current from transistor 32 is provided into a resistor 40 which is used to set the trip point voltage for the short circuit current limiter. Two current sinking transistors are connected to the resistor 40. The current sink transistors divert base drive current away from the output transistors when the trip point voltage has been reached at the base of transistor 20. There are two current sink transistors, transistor 42 and transistor 44 in order to match the two output transistors 20 and 18. In this manner, if temperature causes a change in the VBE voltages of the transistors, the same change occurs in the trip point voltage as in the sensed output voltage. The base of transistor 42 is connected above resistor 40. The collectors of the current sink transistors are connected to ground. The emitter of current sink transistor 44 is connected to the base of output transistor 20. This is the point where the trip point voltage is set. The trip point voltage equals the 2 VBE's of the current sink transistors in addition to the voltage set by resistor 40.

The emitter of transistor 42 is connected to receive current from a transistor 46 and resistor 48. The current provided by transistor 46 is sufficient to keep transistor 42 on.

In a current providing circuit in which the control amplifier 14 relies on a reference voltage proportional to the reference current, the short circuit limiter of the present invention provides significant advantages in that temperature changes do not affect the function of the short circuit current limiting. An increase in the reference current will cause equivalent changes to the voltage which is desired at the output sensing resistor 16 and at the trip point voltage setting resistor 40. Thus, the short circuit limiter of the present invention is advantageously insensitive to temperature changes.

In operation when amplifier 14 and transistor 26 initially turn on, they provide sufficient base drive current to the output transistors to turn them on hard. If the load 22 is short-circuited, an excess amount of current would flow into the output transistors and thus raise the voltage at resistor 16. The voltage rises so quickly the amplifier 14 is unable to respond quickly enough to reduce the base drive current. Thus, the short circuit limiter 10 is used to protect the circuitry. In a short-circuited load condition, the output voltage rises until the voltage at the base of output transistor 20 reaches the trip point voltage. At this point, the short circuit limiter is kicked into operation diverting excess base drive current away from the output transistors and through the current sink transistors 42 and 44 to ground. This short circuit limiter essentially clamps the voltage at the base of transistor 20 to the trip point voltage.

The short circuit limiter provides immediate protection from a short circuit on the load. Most control circuits, such as the one shown in the present embodiment with control amplifier 14 react more slowly than the short circuit limiter. When the control circuitry brings the output current under control, the voltage at the base of transistor 20 will fall below the trip point voltage and base drive current will no longer be diverted into the sink transistors.

Of course, it should be understood that various changes and modifications to the preferred embodiment described above will be apparent to those skilled in art. For example, the number of current sink transistors may be adjusted so as to match the number of output transistors to maintain the temperature insensitivity of the short circuit current limiter. In addition, the short circuit current limiter may be used with a number of different control circuits other than that shown in the preferred embodiment. These and other changes can be made without departing from the spirit and the scope of the invention and without diminishing its attendant advantages. It is therefore intended that such changes and modifications be covered by the following claims.

I claim:

1. A short circuit current limiter for attachment to one or more output transistors controlled by a base drive current, said current limiter comprising:
    means for supplying a first current proportional to a reference current;
    a resistor for receiving said first current;
    current sink transistor means having a first terminal connected to said resistor for receiving a voltage proportional to said first current and a second terminal set to a trip point voltage, said second terminal being for connection to said one or more output transistors so that a portion of said base drive current is diverted into said current sink transistor means when the voltage at the connection to said output transistors rises to said trip point voltage.

2. The current limiter of claim 1 wherein said current sink transistor means comprises a first transistor having an emitter for receiving current to keep it on and having a base to act as the first terminal and a second transistor having a base connected to the emitter of said first transistor and having an emitter which acts as the second terminal of said current sink transistor means.

3. The current limiter of claim 1 wherein said means for supplying a first current comprises a transistor having a resistor connected to its emitter.

4. A circuit for providing current to a load comprising:
    means for supplying a first current proportional to a reference current;
    current sink transistor means;
    resistor means for receiving said first current to set a trip point voltage for said current sink transistor means;
    output transistor means for receiving base drive current to control the output current to said load, said output transistor means connected to said current sink transistor means so that if said load is short circuited a voltage at the connection between said output transistor means and said current sink transistor means exceeds the trip point voltage so as to divert a portion of said base drive current from said output transistor means into said current sink transistor means.

5. The circuit of claim 4 further comprising control means for controlling the output current in said output transistor means in response to a reference voltage proportional to said reference current.

6. A circuit for providing power to a load comprising:
    means for supplying a first current proportional to a reference current;
    a resistor for receiving said first current;
    current sink transistor means having a first terminal connected to said resistor for receiving a voltage proportional to said first current and a second terminal set to a trip point voltage; and
    an output transistor having a collector for connection to said load and a base connected to the second terminal of said transistor means, so that when the voltage at the base of said output transistor rises to the trip point voltage in response to a rise in output current, current is diverted from the base of said output transistor to said current sink transistor means.

7. The circuit of claim 6 further comprising a second output transistor having a collector connected to said load, a base connected to the emitter of said first output transistor and an emitter at a voltage proportional to said output current.

8. The circuit of claim 7 further comprising means for controlling the amount of output current in response to the voltage at the emitter of said second output transistor and a voltage proportional to said reference current.

9. The circuit of claim 6 wherein said current sink transistor means comprises a first transistor having an emitter for receiving current to keep it on and having a base to act as the first terminal and a second transistor having a base connected to the emitter of said first transistor and having an emitter which acts as the second terminal of said current sink transistor means.

10. The circuit of claim 6 wherein said means for supplying a first current comprises a transistor and a resistor which form a current mirror with a reference transistor and a reference resistor which carry the reference current.

* * * * *